(12) United States Patent
Park et al.

(10) Patent No.: US 9,882,188 B2
(45) Date of Patent: Jan. 30, 2018

(54) RECHARGEABLE BATTERY AND MODULE THEREOF

(71) Applicant: SAMSUNG SDI CO., LTD., Yongin-si, Gyeonggi-do (KR)

(72) Inventors: Se-Jong Park, Yongin-si (KR); Yong-Sam Kim, Yongin-si (KR); Sung-Kab Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 736 days.

(21) Appl. No.: 14/253,362

(22) Filed: Apr. 15, 2014

(65) Prior Publication Data
US 2015/0086816 A1 Mar. 26, 2015

(30) Foreign Application Priority Data
Sep. 24, 2013 (KR) .................. 10-2013-0113343

(51) Int. Cl.
*H01M 2/12* (2006.01)
*H01M 2/02* (2006.01)
*H01M 2/04* (2006.01)
*H01M 2/06* (2006.01)
*H01M 2/30* (2006.01)

(52) U.S. Cl.
CPC ....... *H01M 2/1241* (2013.01); *H01M 2/0277* (2013.01); *H01M 2/043* (2013.01); *H01M 2/06* (2013.01); *H01M 2/1252* (2013.01); *H01M 2/30* (2013.01); *H01M 2/0404* (2013.01); *H01M 2220/20* (2013.01)

(58) Field of Classification Search
CPC ..... H01M 2/0267; H01M 2/02; H01M 2/0404
USPC ......................................... 429/163, 175, 176
See application file for complete search history.

(56) References Cited

U.S. PATENT DOCUMENTS

| 2010/0143786 A1* | 6/2010 | Kim | ................... | H01M 2/0245 429/158 |
| 2012/0251856 A1 | 10/2012 | Kim et al. | | |
| 2013/0059170 A1* | 3/2013 | Kim | ..................... | H01M 2/043 429/7 |

(Continued)

FOREIGN PATENT DOCUMENTS

| JP | 2006-100126 | * | 4/2006 | ............. H01M 2/04 |
| JP | 2006-100126 A | | 4/2006 | |

(Continued)

OTHER PUBLICATIONS

Notice of Allowance dated Jan. 23, 2017 of the corresponding Korean Patent Application No. 10-2013-0113343.

(Continued)

*Primary Examiner* — Maria Laios
(74) *Attorney, Agent, or Firm* — Lee & Morse, P.C.

(57) ABSTRACT

A rechargeable battery includes an electrode assembly that performs charging and discharging operations, a case that accommodates the electrode assembly therein, a cap plate coupled to the case, an electrode terminal connected to the electrode assembly and mounted in a terminal hole of the cap plate, and an insulation member that coats the case. The insulation member has a protruding portion that protrudes from an external circumference of the cap plate along a surface of the cap plate. The protruding portion has an exhaust groove on at least one side thereof.

15 Claims, 7 Drawing Sheets

(56) References Cited

U.S. PATENT DOCUMENTS

2013/0108900 A1* 5/2013 Lee .................. H01M 2/34
　　　　　　　　　　　　　　　　　　　　　429/62

FOREIGN PATENT DOCUMENTS

| JP | 2010-287408 | 12/2010 |
| JP | 2012-033419 | 2/2012 |
| KR | 10-2012-0111660 A | 10/2012 |
| KR | 10-2013-0026971 A | 3/2013 |
| KR | 10-2013-0048683 A | 5/2013 |

OTHER PUBLICATIONS

Korean Office Action dated Jul. 6, 2016 in Corresponding Korean Patent Application No. 10-2013-0113343.

* cited by examiner

RECHARGEABLE BATTERY AND MODULE THEREOF

CROSS-REFERENCE TO RELATED APPLICATION

Korean Patent Application No. 10-2013-0113343, filed on Sep. 24, 2013, in the Korean Intellectual Property Office, and entitled: "Rechargeable Battery and Module Thereof," is incorporated by reference herein in its entirety.

BACKGROUND

1. Field

Embodiments relate to a rechargeable battery with a case of which an external part is insulated, and a module thereof.

2. Description of the Related Art

A rechargeable battery is a battery that may be repeatedly charged and discharged, unlike a primary battery. A low-capacity rechargeable battery is used for small portable electronic devices such as a mobile phone, a notebook computer, and a camcorder, and a large-capacity rechargeable battery is used as a power supply for driving a motor such as for a hybrid car.

A rechargeable battery module used to drive a motor for a large-power device, e.g., an electric vehicle, is formed by connecting high-output rechargeable battery cells in series. Each of the battery cells has an electrode that extends through a cap plate thereof and protrudes externally.

SUMMARY

Embodiments are directed to a rechargeable battery that includes an electrode assembly that performs charging and discharging operations, a case that accommodates the electrode assembly therein, a cap plate coupled to the case, an electrode terminal connected to the electrode assembly and mounted in a terminal hole of the cap plate, and an insulation member that coats the case. The insulation member has a protruding portion that protrudes from an external circumference of the cap plate along a surface of the cap plate. The protruding portion has an exhaust groove on at least one side thereof.

The exhaust groove may have a concave form in the protruding portion to correspond to the surface of the cap plate.

The exhaust groove may include two exhaust grooves that are respectively located at two diagonally opposite corners of the cap plate.

The exhaust groove may include four exhaust grooves that are respectively located at four corners of the cap plate.

The insulation member may be in a form of a single sheet attached to the case. End portions of the single sheet may overlap each other at a corner of the cap plate.

End portions of the insulation member may overlap each other at a corner of the case to form an induction groove. The exhaust groove may be located at the corner of the cap plate and may be connected to the induction groove.

The insulation member may be in a form of two sheets attached to the case. End portions of the two sheets may overlap each other at two diagonally opposite corners of the cap plate.

The exhaust groove may include two exhaust grooves that are respectively located at the two diagonally opposite corners of the cap plate at which the end portions of the two sheets of the insulation member overlap each other.

The rechargeable battery may further include a sealing member mounted in the terminal hole, the sealing member partially surrounding the electrode terminal.

The sealing member may include a support portion that protrudes along the cap plate to support the electrode terminal, a sealing portion inserted into the terminal hole in the cap plate; and a pair of ribs that extend from a side of the support portion along the sealing portion, the pair of ribs being located on opposite sides of the electrode terminal.

The pair of ribs may be parallel with each other and may connect a path between the protruding portion and the electrode terminal to exhaust grooves at two diagonally opposite corners of the cap plate.

The pair of ribs may be parallel with each other and may connect a path between the protruding portion and the electrode terminal to exhaust grooves at four corners of the cap plate.

The insulation member may be in a form of a single sheet and attached to the case, end portions of the single sheet overlapping each other at a corner of the cap plate. The exhaust groove may be located at the corner of the cap plate at which the end portions of the insulation member overlap each other. The pair of ribs may be parallel with each other to form a path between the protruding portion and the electrode terminal to a corner of the cap plate at which end portions of the insulation member overlap each other. The path may be connected to an induction groove connected to an exhaust groove at the corner of the case at which end portions of the insulation member overlap each other.

The insulation member may be in a form of two sheets attached to the case. End portions of the two sheets may overlap each other at two diagonally opposite corners of the cap plate. The pair of ribs may be parallel with each other to connect a path formed between the protruding portion and the electrode terminal to exhaust grooves at the two diagonally opposite corners at which the end portions of the sheets overlap each other.

The pair of ribs may be parallel with each other. Each of the pair of ribs includes an inclined surface at an outer side thereof facing the protruding portion.

Embodiments are also directed to a rechargeable battery module including at least two unit cells adjacent to each other in a first direction, each unit cell of the at least two unit cells including an electrode terminal in a terminal hole of a cap plate coupled to a case and an insulation member coating the case, and a bus bar that connects the electrode terminal of one of the two unit cells and the electrode terminal of the other of the two unit cells. The insulation member has a protruding portion that protrudes from an outer circumference of the cap plate along a surface thereof. The protruding portion includes an exhaust groove at a side thereof in a second direction intersecting the first direction.

The exhaust groove of each of the unit cells may include exhaust grooves formed at two diagonally opposite corners of the cap plate, the exhaust grooves of respective units cells being located along the first direction.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1:
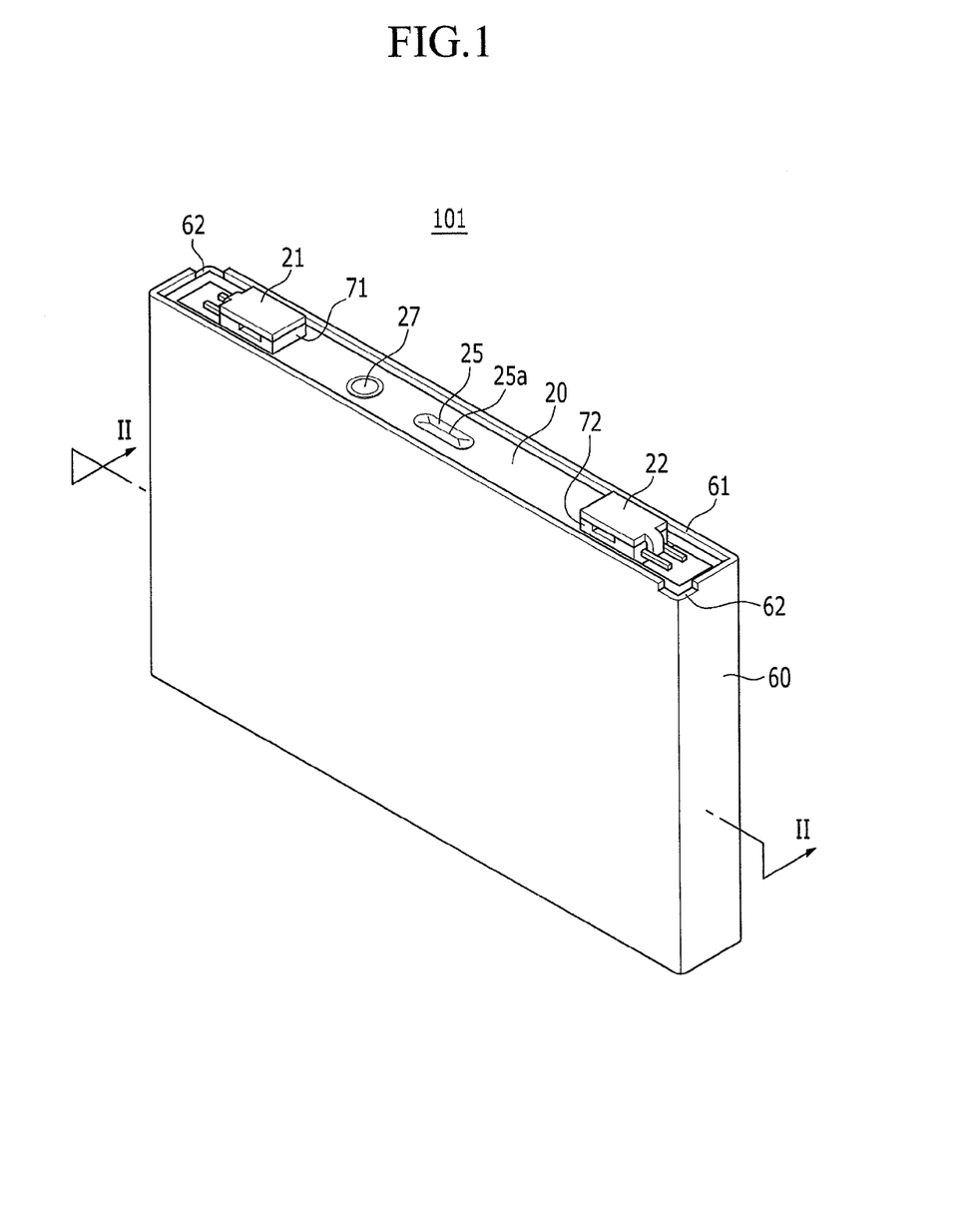
FIG. 1 illustrates a perspective view showing a rechargeable battery in accordance with an exemplary embodiment.
Figure 2:
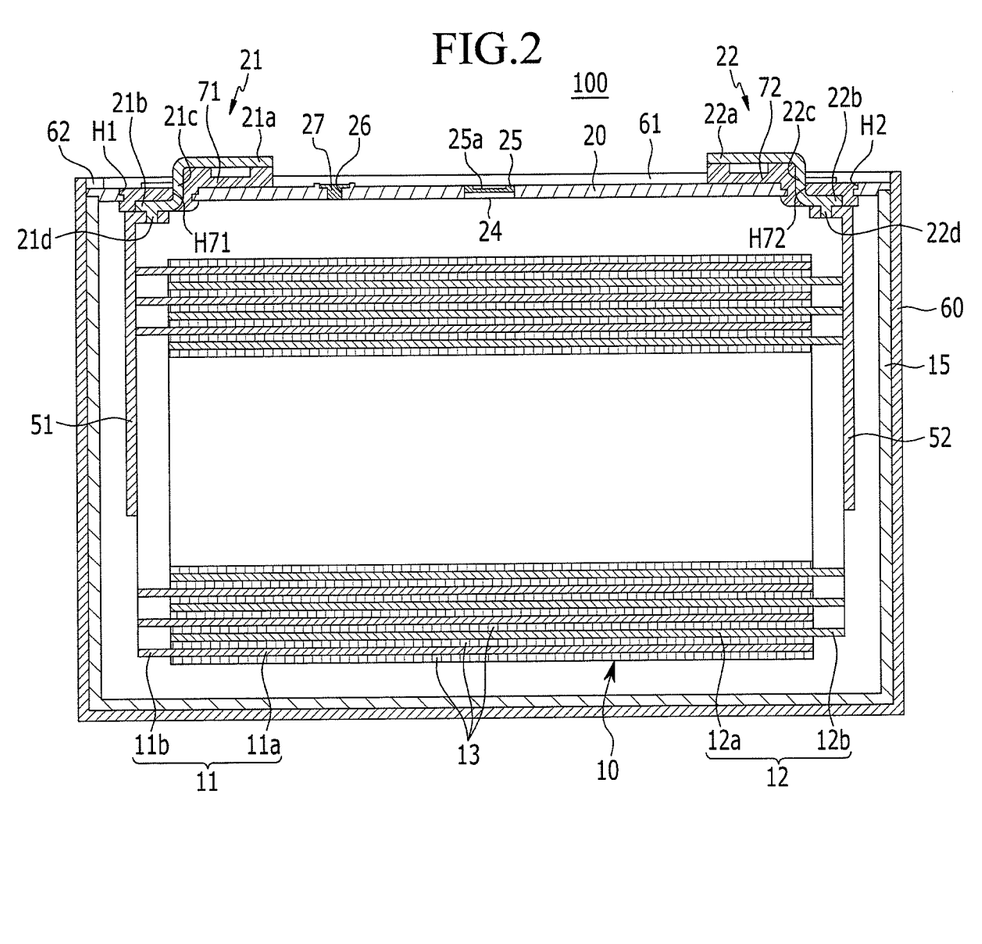
FIG. 2 illustrates a cross-sectional view of the rechargeable battery taken along a line II-II of FIG. 1.

FIG. 1 illustrates a perspective view showing a rechargeable battery in accordance with an exemplary embodiment, and FIG. 2 illustrates a cross-sectional view of the rechargeable battery taken along a line II-II of FIG. 1.

Referring to FIG. 1 and FIG. 2, the rechargeable battery 100 in accordance with this exemplary embodiment includes an electrode assembly 10 for charging and discharging a current, a case 15 accommodating the electrode assembly 10 and electrolyte therein, a cap plate 20 coupled to an opening of the case 15, electrode terminals 21 and 22 respectively installed in the cap plate 20, and an insulation member 60 coated on the case 15.

For example, the electrode assembly 10 may be formed by disposing electrodes (e.g., a negative electrode 11 and a positive electrode 12) on opposite surfaces of a separator 13, which is an insulator, and winding the negative electrode 11, the separator 13, and the positive electrode 12 into a jelly-roll shape.

The negative and positive electrodes 11 and 12 may include coated regions 11a and 12a formed by applying an active material to a current collector of a metal plate, and uncoated regions 11b and 12b, which are exposed portions of the current collector to which the active material is not applied.

The uncoated region 11b of the negative electrode 11 may be formed at one end of the negative electrode 11 along the wound negative electrode 11. The uncoated region 12b of the positive electrode 12 may be formed at one end of the positive electrode 12 along the wound positive electrode 12. The uncoated regions 11b and 12b may be respectively disposed at opposite ends of the electrode assembly 10.

The case 15 may have an approximately cuboid shape so as to define an internal space thereof for accommodating the electrode assembly 10 therein. An opening for connecting external and internal spaces may be formed on one side of the cuboid. The electrode assembly 10 may be inserted into the case 15 through the opening.

The cap plate 20 may be installed in the opening of the case 15 to close and seal the case 15. For example, the case 15 and the cap plate 20 may be made of aluminum and may be welded to each other After the electrode assembly 10 is inserted into the case 15, the cap plate 20 may be welded to the opening of the case 15.

The cap plate 20 may have at least one opening, for example, terminal holes H1 and H2, a vent hole 24, and electrolyte injection opening 26. The electrode terminals 21 and 22 may be respectively installed in the terminal holes H1 and H2 of the cap plate 20, and may be electrically connected to the electrode assembly 10.

The electrode terminals 21 and 22 may be respectively electrically connected to the negative electrode 11 and positive electrode 12 of the electrode assembly 10 via lead tabs 51 and 52

Accordingly, the electrode assembly 10 may be drawn out of the case 15 through the electrode terminals 21 and 22.

The vent hole 24 may be closed and sealed by a vent plate 25. When the internal pressure of the rechargeable battery reaches a predetermined value, the vent plate 25 may be ruptured to open the vent hole 24 so as to exhaust an internal pressure of the rechargeable battery and gases generated in the rechargeable battery. The vent plate 25 may have a notch 25a for inducing the rupturing. The electrolyte injection opening 26 may be sealed by using a sealing cap 27 after an electrolyte solution is injected into the rechargeable battery 100.

The electrode terminals 21 and 22 may be respectively connected to the lead tabs 51 and 52. The lead tabs 51 and 52 may be respectively electrically connected to the negative electrode 11 and the positive electrode 12. One side of the lead tabs 51 and 52 may be connected to a respective one of the uncoated regions 11b and 12b of the negative electrode and the positive electrodes 11 and 12, and other sides thereof may be connected to respective ones of the electrode terminals 21 and 22

The electrode terminals 21 and 22 may be respectively installed in the terminal holes H1 and H2 of the cap plate 20 via sealing members 71 and 72. The electrode terminals 21 and 22 may be formed to have a plate shape, and respectively to have first connection portions 21a and 22a, which are located outside the case 15, second connection portions 21b and 22b, which are inserted into the inside of the case 15 to be connected to the lead tabs 51 and 52, and third connection portions 21c and 22c, which are bent to connect the first connection portions 21a and 22a to the second connection portions 21b and 22b.

The first connection portions 21a and 22a may be disposed outside the cap plate 20 in parallel with the cap plate 20. The first connection portions 21a and 22a may be respectively formed to extend from the third connection portions 21c and 22c toward the center of the cap plate 20.

The second connection portions 21b and 22b may be disposed inside the cap plate 20 in parallel with the cap plate 20. The second connection portions 21b and 22b may be respectively formed to extend from the third connection portions 21c and 22c in a direction toward the outside of the cap plate 20.

The first connection portions 21a and 22a and the second connection portions 21b and 22b may be formed to extend respectively from an upper side and a lower side of the third connection portions 21c and 22c in opposite directions in the electrode terminals 21 and 22.

Protrusions 21d and 22d may be respectively formed on bottoms of the second connection portions 21b and 22b. The protrusions 21*d* and 22*d* may respectively be inserted into holes of the lead tabs 51 and 52 to be coupled thereto by caulking or welding. The second connection portions 21*b* and 22*b* and the first and second lead tabs 51 and 52 may be respectively insulated from the cap plate 20 by the sealing members 71 and 72.

The third connection portion 21*c* may be bent at substantially 90 degrees from each of the first connection portion 21*a* and the second connection portion 21*b* to be inserted into a hole H71 formed in the sealing member 71. The third connection portion 22*c* may be bent at substantially 90 degrees from the first connection portion 22*a* and the second connection portion 22*b* to be inserted into a hole H72 formed in the sealing member 72. Further, the third connection portions 21*c* and 22*c* may be respectively disposed in the terminal holes H1 and H2 extending through the cap plate 20.

As a result, in the electrode terminals 21 and 22, the first connection portions 21*a* and 22*a* and the second connection portions 21*b* and 22*b* may be respectively disposed in parallel with the cap plate 20, and the third connection portions 21*c* and 22*c* may be respectively disposed to be perpendicular to the first connection portions 21*a* and 22*a* and the second connection portions 21*b* and 22*b*.

In the rechargeable battery 100, the sealing members 71 and 72 may have structures that are symmetrical to each other. Accordingly, the sealing member 71, which supports the electrode terminal 21 connected to the negative electrode 11 and seals the terminal hole H1, may be taken as an example for convenience of description and it is to be understood that such description may also be applied to the sealing member 72.

Figure 3:
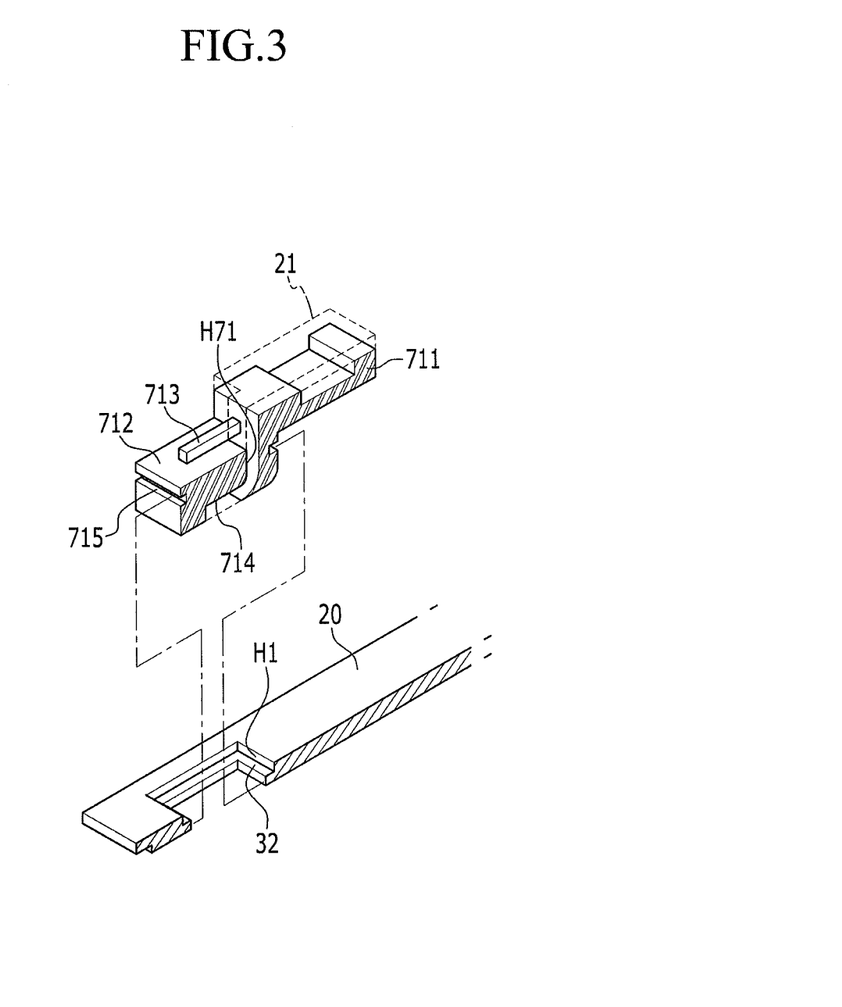
FIG. 3 illustrates an exploded cross-sectional perspective view showing a cap plate and a sealing member shown in FIG. 1.

FIG. 3 illustrates an exploded cross-sectional perspective view showing a cap plate and a sealing member shown in FIG. 1. Referring to FIG. 1 to FIG. 3, the sealing member 71 may include a support portion 711 disposed on the cap plate 20, a sealing portion 712 inserted into the terminal hole H1 formed in the cap plate 20 to be secured thereto, and a pair of ribs 713 extending from a side of the support portion 711 along the sealing portion 712 to be respectively disposed at opposite sides of the electrode terminal 21. (Since FIG. 3 is a cross-sectional perspective view of the sealing member 71, only one rib 713 is shown in FIG. 3.)

The support portion 711 may be disposed between a bottom surface of the first connection portion 21*a* and a top surface of the cap plate 20 to separate the first connection portion 21*a* from the cap plate 20 while supporting the first connection portion 21*a*. Further, the support portion 711 may serve to insulate the cap plate 20 and the first connection portion 21*a* from each other. The sealing portion 712 may include the hole H71 through which the third connection portion 21*c* is extended, and an accommodation hole 714 formed at a lower side thereof to extend to the hole H71 for accommodating the second connection portion 21*b*.

The terminal hole H1 corresponding to the sealing portion 712 may include a protruding blocking part 32. The sealing portion 712 may include a catching portion 715 that fits into the blocking part 32. The blocking part 32 may be formed as a protrusion to extend along an inner circumferential surface of the terminal hole H1 in a circumference direction thereof. The catching portion 715 may be formed as a groove into which the blocking part 32 is inserted to extend along an outer circumference of the sealing portion 712. As a result, the blocking part 32 and the catching portion 715 may serve to increase a contact area between the terminal hole H1 and the sealing portion 712, thereby improving the sealing performance.

Figure 4:
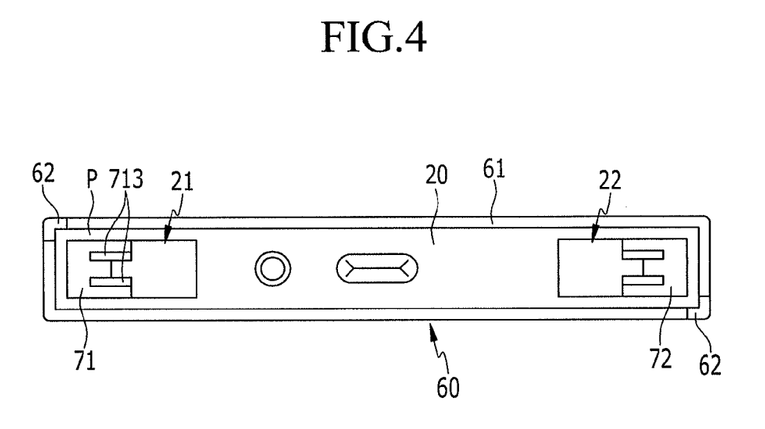
FIG. 4 illustrates a plan view showing the rechargeable battery shown in FIG. 1.

FIG. 4 illustrates a plan view showing the rechargeable battery shown in FIG. 1. Referring to FIG. 4, the pair of ribs 713 may be formed to extend from a side of the support portion 711 along the sealing portion 712 in parallel with each other to be disposed at opposite sides of the third connection portion 21*c*. The pair of ribs 713 may be formed to face a protruding portion 61 that protrudes along an outer circumference of the cap plate 20, forming a path P therebetween. The pair of ribs 713 may block an inflow of moisture generated on the cap plate 20 toward the hole H71.

The sealing members 71 and 72 may be insert-molded in a state in which the electrode terminals 21 and 22 are installed in the terminal holes H1 and H2 of the cap plate 20. Accordingly, when formed, the sealing members 71 and 72 may be securely mounted in the terminal holes H1 and H2 of the cap plate 20, and may be safely secured on the cap plate 20 while partially covering the electrode terminals 21 and 22.

Again referring to FIG. 1 and FIG. 2, the insulation member 60 may be coated on an outer surface of the case 15 and the outer circumference of the cap plate 20 to improve insulation of the rechargeable battery 100. Accordingly, the insulation member 60 may include the protruding portion 61 which protrudes along the outer circumference of the cap plate 20.

The protruding portion 61 may have an exhaust groove 62 formed on at least one side thereof. The exhaust groove 62 may serve to exhaust moisture generated on the cap plate 20 due to condensation and the like to the outside of the cap plate 20. Therefore, corrosion caused by the cap plate 20 may be prevented or minimized.

In this case, the exhaust groove 62 may be concavely formed in the protruding portion 61 to correspond to the surface of the cap plate 20. As a result, a bottom surface of the exhaust groove 62 may be on the same plane as the outer surface of the cap plate 20. Thus, the exhausting of moisture may not be blocked on the outer surface of the cap plate by the exhaust groove 62.

For example, the exhaust groove 62 may include exhaust grooves 62 that are respectively formed at two diagonally opposite ones of four corners of the cap plate 20. The exhaust grooves 62 may be connected to the path P formed between the protruding portion 61 and the ribs 713.

The pair of ribs 713 may be formed in parallel with each other to connect the path P formed between the protruding portion 61 and the electrode terminals 21 and 22 to the exhaust grooves 62 formed at the two diagonally opposite corners of the cap plate 20.

Accordingly, when the rechargeable battery 100 is leftwardly or rightwardly inclined, the moisture on the cap plate 20 may be guided to the exhaust groove 62 through the path P formed between the protruding portion 61 and the electrode terminals 21 and 22 to be smoothly exhausted therefrom.

Hereinafter, various exemplary embodiments will be described. Descriptions of the same configurations as in the first exemplary embodiment and the described exemplary embodiment will not be repeated, and different configurations from the first exemplary embodiment will now be described.

Figure 5:
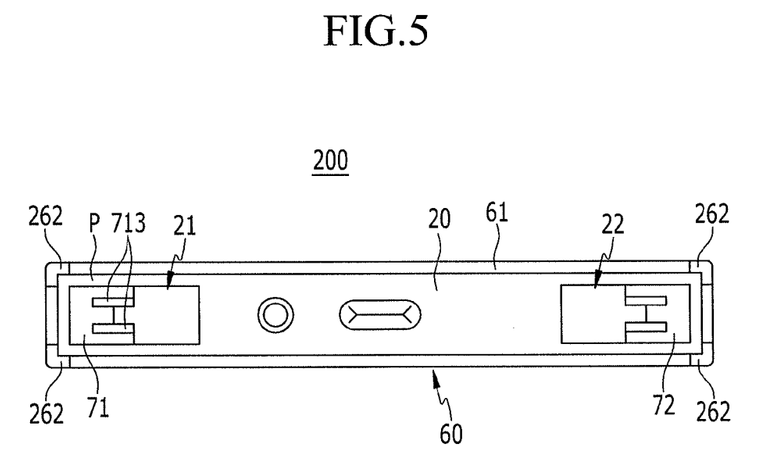
FIG. 5 illustrates a plan view showing a rechargeable battery in accordance with another exemplary embodiment.

FIG. 5 illustrates a plan view showing a rechargeable battery in accordance with another exemplary embodiment. Referring to FIG. 5, in the rechargeable battery 200 of this exemplary embodiment, exhaust grooves 262 may be respectively formed at the four corners of the cap plate 20. The exhaust grooves 262 may be connected to the path P formed between the protruding portion 61 and the ribs 713.

The pair of ribs 713 may be formed in parallel with each other to connect the path P formed between the protruding portion 61 and the electrode terminals 21 and 22 to the exhaust grooves 262 formed at the four corners of the cap plate 20.

Accordingly, when the rechargeable battery 200 is leftwardly, rightwardly, frontwardly, or backwardly inclined, the moisture on the cap plate 20 may be guided to the exhaust grooves 262 through the path P formed between the protruding portion 61 and the electrode terminals 21 and 22 to be smoothly exhausted therefrom.

In the rechargeable batteries 100 and 200, the insulation member 60 may be formed of a single sheet and attached to the case 15 and the cap plate 20. Ends of the single sheet may be correspondingly brought into contact with each other at a corner of the case 15 and the cap plate 20.

Figure 6:
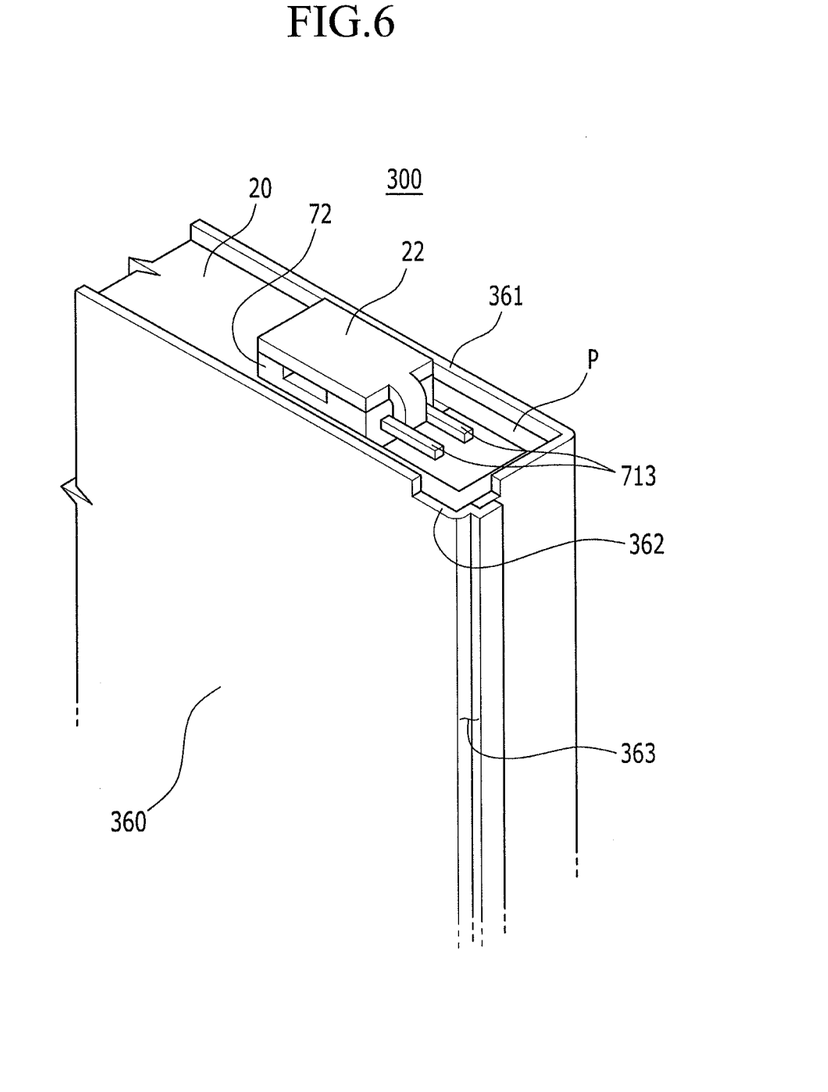
FIG. 6 illustrates a partial perspective view showing another exemplary embodiment.

FIG. 6 illustrates a partial perspective view showing another exemplary embodiment. Referring to FIG. 6, in a rechargeable battery 300 of this exemplary embodiment, an insulation member 360 may be formed of a single sheet and attached to the case 15 and the cap plate 20. End portions of the single sheet may overlap at a corner of the case 15 and the cap plate 20.

The insulation member 360 may include an induction groove 363 formed in a height direction to correspond to the corner of the case 15. An exhaust groove 362 may be correspondingly formed at a corner of the cap plate 20 at which end portions of the insulation member 360 are formed, to be connected to the induction groove 363. As shown in FIG. 6, the exhaust groove 362 may have a larger area than the overlapped area of the insulation member 360.

The pair of ribs 713 may be formed in parallel with each other to form the path P between a protruding portion 361 and the electrode terminal 22 to correspond to a corner of the cap plate 20 The path P may be connected to the induction groove 363 through the exhaust groove 362. The exhaust groove 362 may be formed at one of the four corners of the cap plate 20 to correspond to the induction groove 363.

When the rechargeable battery 300 is inclined with respect to a side thereof, the moisture generated on the cap plate 20 may be guided to the exhaust groove 362 through the path P between the protruding portion 361 and the electrode terminal 22 to be exhausted therefrom.

In other implementations, the exhaust groove 62 may be further formed at the protruding portion 361 in a diagonal direction of the exhaust groove 362 as in the exemplary embodiment illustrated in FIG. 4. In this case, when the rechargeable battery is leftwardly or rightwardly inclined, the moisture may be smoothly exhausted as in the exemplary embodiment illustrated in FIG. 4.

In other implementations, the exhaust groove 262 may be further formed at the protruding portion 361 in another diagonal direction of the exhaust groove 362 as in the exemplary embodiment illustrated in FIG. 5. In this case, when the rechargeable battery is leftwardly, rightwardly, frontwardly, or backwardly inclined, the moisture may be smoothly exhausted as in the exemplary embodiment illustrated in FIG. 5.

Figure 7:
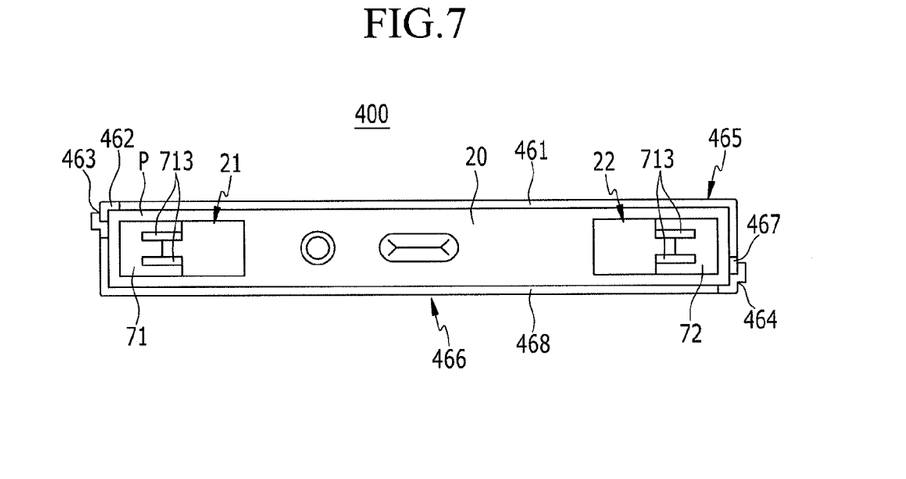
FIG. 7 illustrates a plan view showing a rechargeable battery in accordance with another exemplary embodiment.

FIG. 7 illustrates a plan view showing a rechargeable battery in accordance with another exemplary embodiment. Referring to FIG. 7, in a rechargeable battery 400 according to this exemplary embodiment, the insulation member may be formed of two sheets 465 and 466 attached to the case 15 and the cap plate 20. End portions of the two sheets may overlap at two diagonally opposite corners of the case 15 and the cap plate 20.

In the insulation members 465 and 466, induction grooves 463 and 464 may be respectively correspondingly formed in a height direction thereof at the diagonally opposite corners of the case 15. Exhaust grooves 462 and 467 may be respectively correspondingly formed at the diagonally opposite corners of the case 15 at which the end portions of the insulation members 465 and 466 overlap each other such that the exhaust grooves 462 and 467 may be connected to the induction grooves 463 and 464.

The pair of ribs 713 may be formed in parallel with each other to connect the path P formed between protruding portions 461 and 468 and the electrode terminals 21 and 22 to the exhaust grooves 462 and 467 formed at the diagonally opposite corners of the case 15 at which the end portions of the insulation members 465 and 466 overlap each other. The path P may be connected to the induction grooves 463 and 464 through the exhaust grooves 462 and 467. The exhaust grooves 462 and 467 may respectively be formed at two of the four corners of the cap plate 20 which correspond to the induction grooves 463 and 464.

When the rechargeable battery 400 is inclined with respect to opposite sides thereof, the moisture generated on the cap plate 20 may be guided to the exhaust grooves 462 and 467 through the path P formed between the protruding portions 461 and 468 and the electrode terminals 21 and 22 to be exhausted to the exhaust grooves 462 and 467.

Similarly, the exhaust groove 62 may be further formed at the protruding portions 461 and 468 in one diagonal direction and another diagonal direction of the exhaust grooves 462 and 467 as in the embodiment illustrated in FIG. 5. In this case, when the rechargeable battery is leftwardly, rightwardly, frontwardly, or backwardly inclined, the moisture may be smoothly exhausted as in the exemplary embodiment illustrated in FIG. 5.

Figure 8:
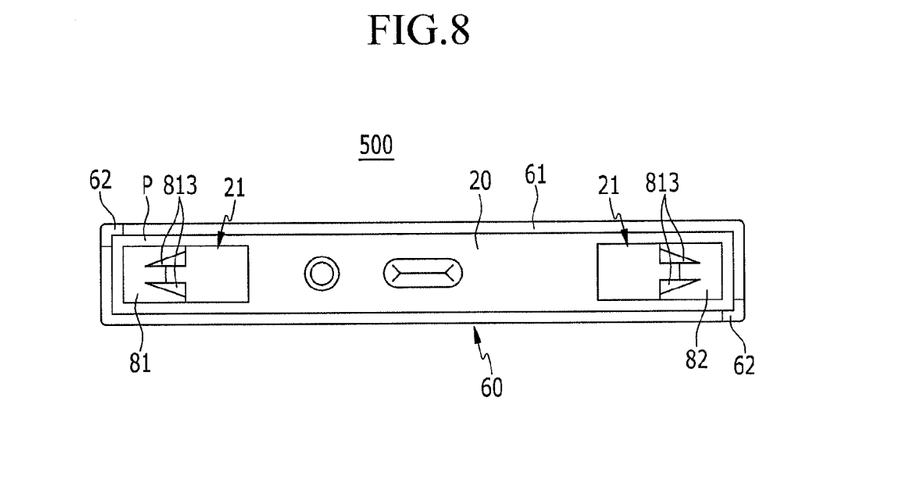
FIG. 8 illustrates a plan view showing a rechargeable battery in accordance with another exemplary embodiment.

FIG. 8 illustrates a plan view showing a rechargeable battery in accordance with another exemplary embodiment. Referring to FIG. 8, in a rechargeable battery 500 of this exemplary embodiment, a pair of ribs 813 of each of sealing members 81 and 82 may be formed in parallel with each other to form an outer side thereof facing the protruding portion 61 as an inclined surface.

Accordingly, when the rechargeable battery 500 is leftwardly or rightwardly inclined, the moisture on the cap plate 20 may be more easily guided to the exhaust grooves 62 to be smoothly exhausted therefrom.

For convenience, this exemplary embodiment has been described in a case where the ribs 713 of exemplary embodiment illustrated in FIG. 1 are replaced with the inclined ribs 813. It is to be understood that the pair of ribs 713 of the exemplary embodiments illustrated in any of FIGS. 5-7 may be replaced also be replaced with the inclined ribs 813 of the present embodiment.

The insulation member 60, 360, 465, or 466 may be formed of an insulation tape, or a synthetic resin-based material such as polypropylene (PP), polyimide (PI), or polyethylene terephthalate.

Figure 9:
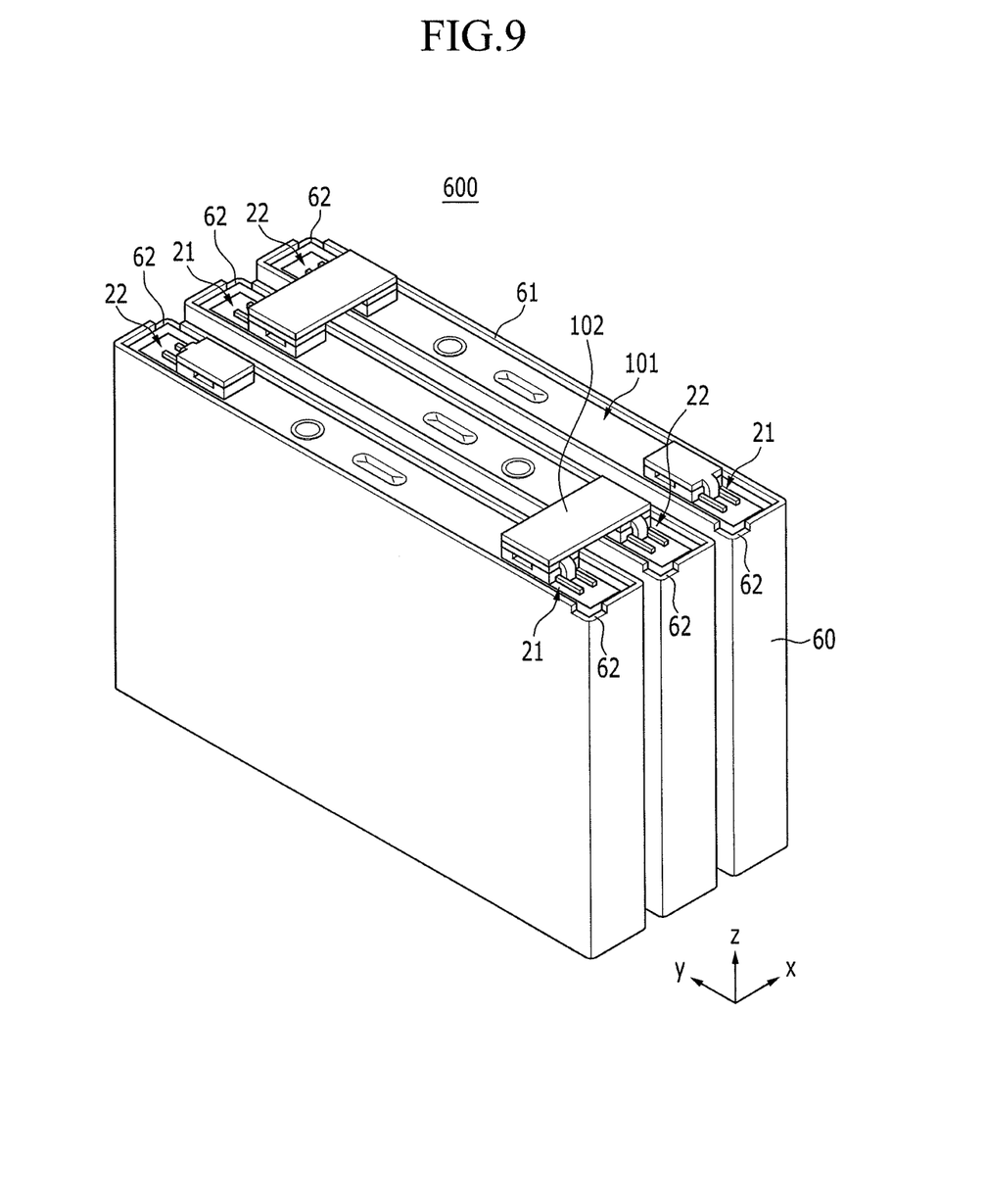
FIG. 9 illustrates a perspective view showing a rechargeable battery module in accordance with an exemplary embodiment.

FIG. 9 illustrates a perspective view showing a rechargeable battery module in accordance with an exemplary embodiment. Referring to FIG. 9, a rechargeable battery module 600 may be formed by connecting a plurality of unit cells 101 to each other using bus bars 102. For convenience, the unit cells 101 are formed of the rechargeable batteries 100 of the exemplary embodiment illustrated in FIGS. 1 and 4. In other implementations, the unit cells 101 may be the rechargeable batteries 200 to 500 illustrated in FIGS. 5 through 8.

Each case 15 of the unit cells 101 may be coated with the insulation member 60. The unit calls 101 may be adjacently disposed in a direction (e.g., x-axis direction). The bus bars 102 may be disposed in, e.g., a y-axis direction, and may electrically connect the electrode terminal 21 of one of two adjacent unit cells 101 to the electrode terminal 22 of the other unit cell 101.

In each of the unit cells 101, the protruding portion 61 of the corresponding insulation member 60 may have the exhaust grooves 62 formed at two diagonally opposite corners of the cap plate 20. Each of the exhaust grooves 62 may be disposed along the x-axis direction at opposite ends thereof in the y-axis direction in the rechargeable battery module 600.

Accordingly, moisture generated on the cap plate 20 of each of the unit cells 101 may be exhausted to the exhaust grooves 62 formed at the opposite sides (in the y-axis direction) of the corresponding unit cell 101. Accordingly, no current path may be formed by moisture between the unit cells 101 that are adjacent to each other in the x-axis direction.

By way of summation and review, in a rechargeable battery module, a case of each of the battery cells may be coated with an insulation member, except at a surface of the cap plate. The insulation member may protrude to a higher height than the cap plate in order to improve the insulation of the case. In such a rechargeable battery module, moisture that is generated on the cap plate due to condensation may form a current path between adjacent battery cells. Further, if the moisture stays on the cap plate for a long time, the battery cells may be corroded.

Embodiments provide a rechargeable battery in which moisture may be exhausted from a cap plate. Embodiments also provide a rechargeable battery module including the rechargeable battery as a unit cell thereof.

According to embodiments, moisture generated on the cap plate may be exhausted by providing an exhaust groove at a protruding portion of an insulating member that protrudes from the outer circumference of the cap plate. Accordingly, it may be possible to prevent or minimize corrosion of the cap plate caused by the moisture.

Further, the rechargeable battery module may be formed by adjacently disposing the unit cells in the first direction to exhaust the moisture from the cap plate of the rechargeable battery module in the second direction intersecting the first direction (toward opposite sides of the unit cells and the rechargeable battery module). Accordingly, a current path between the unit cells that are adjacent to each other in the first direction may be blocked.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A rechargeable battery, comprising:
    an electrode assembly that performs charging and discharging operations;
    a case that accommodates the electrode assembly therein;
    a cap plate coupled to the case;
    an electrode terminal connected to the electrode assembly and mounted in a terminal hole of the cap plate;
    a sealing member mounted in the terminal hole, the sealing member partially surrounding the electrode terminal, wherein the sealing member includes a support portion that protrudes along the cap plate to support the electrode terminal, a sealing portion inserted into the terminal hole in the cap plate, and a pair of ribs that extend from a side of the support portion along the sealing portion, the pair of ribs being located on opposite sides of the electrode terminal; and
    an insulation member that coats the case,
    wherein the insulation member has a protruding portion that protrudes from an external circumference of the cap plate along a surface of the cap plate, and
    the protruding portion has an exhaust groove on at least one side thereof.

2. The rechargeable battery as claimed in claim 1, wherein the exhaust groove has a concave form in the protruding portion to correspond to the surface of the cap plate.

3. The rechargeable battery as claimed in claim 1, wherein the exhaust groove includes two exhaust grooves that are respectively located at two diagonally opposite ones of four corners of the cap plate.

4. The rechargeable battery as claimed in claim 1, wherein the exhaust groove includes four exhaust grooves that are respectively located at four corners of the cap plate.

5. The rechargeable battery as claimed in claim 1, wherein the insulation member is in a form of a single sheet attached to the case, end portions of the single sheet overlapping each other at a corner of the cap plate.

6. The rechargeable battery as claimed in claim 1, wherein:
    end portions of the insulation member overlap each other at a corner of the case to form an induction groove, and
    the exhaust groove is located at the corner of the cap plate and is connected to the induction groove.

7. The rechargeable battery as claimed in claim 1, wherein:
    the insulation member is in a form of two sheets attached to the case, and
    end portions of the two sheets are overlap each other at two diagonally opposite corners of the cap plate.

8. The rechargeable battery as claimed in claim 7, wherein the exhaust groove includes two exhaust grooves that are respectively located at the two diagonally opposite corners of the cap plate at which the end portions of the two sheets of the insulation member overlap each other.

9. The rechargeable battery as claimed in claim 1, wherein the pair of ribs are parallel with each other and connect a path between the protruding portion and the electrode terminal to exhaust grooves at two diagonally opposite corners of the cap plate.

10. The rechargeable battery as claimed in claim 1, wherein the pair of ribs are parallel with each other and connect a path between the protruding portion and the electrode terminal to exhaust grooves at four corners of the cap.

11. The rechargeable battery as claimed in claim 1, wherein:
    the insulation member is in a form of a single sheet and attached to the case, end portions of the single sheet overlapping each other at a corner of the cap plate, the exhaust groove is located at the corner of the cap plate at which end portions of the insulation member overlap each other, the pair of ribs are parallel with each other to form a path between the protruding portion and the electrode terminal to the corner of the cap plate at which end portions of the insulation member overlap each other, and the path is connected to an induction groove connected to the exhaust groove at the corner of the case at which end portions of the insulation member overlap each other.

12. The rechargeable battery as claimed in claim 1, wherein:

the insulation member is in a form of two sheets attached to the case, end portions of the two sheets overlap each other at two diagonally opposite corners of the cap plate, and the pair of ribs are parallel with each other to connect a path formed between the protruding portion and the electrode terminal to exhaust grooves at the two diagonally opposite corners at which the end portions of the sheets overlap each other.

13. The rechargeable battery of claim 1, wherein:

the pair of ribs are parallel with each other, and each of the pair of ribs includes an inclined surface at an outer side thereof facing the protruding portion.

14. A rechargeable battery module, comprising:

at least two unit cells adjacent to each other in a first direction, each unit cell of the at least two unit cells including an electrode terminal in a terminal hole of a cap plate coupled to a case, a sealing member mounted in the terminal hole, the sealing member partially surrounding the electrode terminal, wherein the sealing member includes a support portion that protrudes along the cap plate to support the electrode terminal, a sealing portion inserted into the terminal hole in the cap plate, and a pair of ribs that extend from a side of the support portion along the sealing portion, the pair of ribs being located on opposite sides of the electrode terminal; and an insulation member coating the case; and a bus bar that connects the electrode terminal of one of the two unit cells and the electrode terminal of the other of the two unit cells, wherein the insulation member has a protruding portion that protrudes from an outer circumference of the cap plate along a surface thereof, and the protruding portion including an exhaust groove at a side thereof in a second direction intersecting the first direction.

15. The rechargeable battery module as claimed in claim 14, wherein the exhaust groove of each of the unit cells includes exhaust grooves formed at two diagonally opposite corners of the cap plate, the exhaust grooves of respective units cells being located along the first direction.

* * * * *